US009516652B2

(12) United States Patent
Fodor et al.

(10) Patent No.: US 9,516,652 B2
(45) Date of Patent: Dec. 6, 2016

(54) PRE-EMPTION AND RESOURCE ALLOCATION PRIORITIZATION FOR D2D COMMUNICATIONS

(71) Applicant: Telefonaktiebolaget L M Ericsson (publ), Stockholm (SE)

(72) Inventors: Gabor Fodor, Hässelby (SE); Marco Belleschi, Solna (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 70 days.

(21) Appl. No.: 14/399,359

(22) PCT Filed: Aug. 11, 2014

(86) PCT No.: PCT/SE2014/050928
§ 371 (c)(1),
(2) Date: Nov. 6, 2014

(87) PCT Pub. No.: WO2016/024890
PCT Pub. Date: Feb. 18, 2016

(65) Prior Publication Data
US 2016/0150520 A1    May 26, 2016

(51) Int. Cl.
*H04W 72/02* (2009.01)
*H04W 28/16* (2009.01)
(Continued)

(52) U.S. Cl.
CPC .......... *H04W 72/048* (2013.01); *H04L 47/745* (2013.01); *H04L 47/805* (2013.01);
(Continued)

(58) Field of Classification Search
CPC ........... H04W 28/0289; H04W 28/085; H04W 28/26; H04W 36/22; H04W 52/245; H04W 88/08; H04W 28/20; H04W 52/0212; H04W 72/1242; H04L 5/0007; H04L 1/1864; H04L 45/302; H04L 5/0032; H04L 65/80; H04M 1/72572
See application file for complete search history.

(56) References Cited

U.S. PATENT DOCUMENTS

2012/0250509 A1   10/2012 Leung et al.
2013/0155966 A1*   6/2013 Bekiares ............... H04W 28/16
                                                370/329
(Continued)

FOREIGN PATENT DOCUMENTS

EP            2 693 800         8/2012
WO      WO 2012/061993         5/2012
WO      WO 2014/060032         4/2014

OTHER PUBLICATIONS

PCT Notification of Transmittal of the International Search Report and the Written Opinion of the International Searching Authority, or the Declaration for International application No. PCT/SE2014/050928, Aug. 11, 2014.

*Primary Examiner* — Nizar Sivji
(74) *Attorney, Agent, or Firm* — Baker Botts, LLP

(57) ABSTRACT

A network node assigns resources for use in wireless communication based on priority. The network node receives, from a wireless communication device, a service request message that requests connection of a communication session. The network node determines a priority level for the requested communication session. The priority level comprises a cellular layer admission priority of whether the network node can preempt cellular resources of an existing communication session in order to admit the requested communication session on the cellular layer, and a device-to-device (D2D) layer admission priority of whether the network node can preempt D2D resources of an existing communication session in order to admit the requested
(Continued)

communication session on the D2D layer. The network node assigns resources based at least in part on the priority level. The resources are used for D2D communication or cellular communication.

18 Claims, 11 Drawing Sheets

(51) Int. Cl.
*H04W 72/04* (2009.01)
*H04W 72/10* (2009.01)
*H04W 76/02* (2009.01)
*H04L 12/911* (2013.01)
*H04L 12/927* (2013.01)
*H04W 28/02* (2009.01)
*H04L 12/851* (2013.01)
*H04W 88/10* (2009.01)

(52) U.S. Cl.
CPC ....... *H04L 47/824* (2013.01); *H04W 28/0215* (2013.01); *H04W 28/16* (2013.01); *H04W 72/10* (2013.01); *H04W 76/023* (2013.01); *H04L 47/245* (2013.01); *H04W 88/10* (2013.01)

(56) References Cited

U.S. PATENT DOCUMENTS

| | | | | |
|---|---|---|---|---|
| 2015/0382365 A1* | 12/2015 | Li | ......................... | H04L 5/0085 370/329 |
| 2016/0021676 A1* | 1/2016 | Yamazaki | ............. | H04W 72/10 370/329 |

* cited by examiner

PRE-EMPTION AND RESOURCE ALLOCATION PRIORITIZATION FOR D2D COMMUNICATIONS

PRIORITY

This nonprovisional application is a U.S. National Stage Filing under 35 U.S.C. §371 of International Patent Application Serial No. PCT/SE2014/050928, filed Aug. 11, 2014, and entitled "Pre-Emption and Resource Allocation Prioritization for D2D Communications".

TECHNICAL FIELD

The invention relates, in general, to wireless communications and, more particularly, to resource allocation prioritization for device-to-device and cellular communications.

BACKGROUND

In a wireless network, a wireless communication device (e.g., a Mobile Station (MS) or User Equipment (UE)) communicates with one or more network nodes which provide radio access to send and/or receive information, such as voice traffic, data traffic, and control signals. In particular, control plane signaling and/or user plane data to and from the wireless communication device are carried over a communication layer. Examples of communication layers include a cellular layer and a device-to-device (D2D) layer. In the cellular layer, signals are communicated between the wireless communication device and a network node, such as a base station or eNodeB. In the D2D layer, signals are communicated directly between a first D2D wireless communication device and a second D2D wireless communication device. Such communication can be either assisted by the cellular network infrastructure when it is available, or it can happen in an autonomous fashion in case the cellular network is damaged. The use of D2D communications for proximity services (ProSe) in the cellular spectrum increases the spectrum utilization because a pair of UEs communicating in D2D mode may reuse the cellular spectrum resources such as the uplink and/or downlink physical resource blocks (PRB) of a 3GPP LTE system. With respect to both the cellular layer and the D2D layer, network nodes are responsible for assigning resources. Assignment of resources may be based on radio conditions on the network.

Resource preemption is a well-known technique for managing radio bearer (RB) resources or other radio resources in a wireless network. In preemption, resources are de-allocated from a lower priority communication session (the preempted communication session) and reallocated to a higher priority communication session. In 3GPP Long Term Evolution (LTE) networks, for example, each RB is associated with a so called Allocation and Retention Priority (ARP) level. If the network is congested, the ARP level allows the base station (eNodeB or eNB) to decide whether or not a new request for a radio bearer has a high enough priority to preempt an ongoing bearer and, if yes, which ongoing bearer(s) should be preempted in order to free up resources, e.g., which ongoing bearer(s) have a lower priority.

In 3GPP LTE networks, the eNB is responsible for ensuring that the necessary quality of service (QoS) for a bearer over the radio interface is maintained. In LTE, each bearer is associated with an allocation and retention priority (ARP) indicator that is used by the eNB in congestion situations to decide which bearer can be dropped (preempted) or must be maintained (retained). ARP is also used to make admission decisions of newly arriving RB requests. For example, an arriving high priority RB request can be granted by the eNB even in a congestion situation by preempting an ongoing low priority RB. A low priority RB can also be preempted in order to maintain the QoS of ongoing high ARP bearers.

For example, in legacy 3GPP LTE networks, ARP settings along with other QoS attributes are transferred by the core network to the eNB at radio bearer setup request. Also, the ARP contains information about the priority level, the pre-emption capability indicator (PCI) and the pre-emption vulnerability indicator (PVI) related to the bearer request. The PCI information defines whether a certain bearer can tear down (preempt) some other bearers in the system with lower ARP priority in order to free up resources for the new preemption-capable bearer. The PVI defines whether a bearer is vulnerable to be torn down (should not be pre-empted) by a preemption-capable bearer.

ARP is also used by radio admission control (RAC) procedures that are intertwined with preemption and retention decisions. RAC typically discriminates bearers on the basis of ARP values to decide whether a given bearer can be admitted or not. Such decision is particularly critical especially in high load scenarios, since on one hand high priority ARP bearers should not be penalized too much, but on the other hand the service integrity of already existing guaranteed bit rate (GBR) bearers should be preserved. In this perspective, RAC protects the cell from congestion risks that may compromise service integrity and retain-ability of the served high-priority bearers, e.g., GBR bearers, especially in highly loaded scenario. At the same time, RAC ensures a certain degree of accessibility to radio resources for services that have high priority (e.g., emergency calls) or privileged access (e.g., business subscriptions).

In order to meet this goal, legacy systems employ/trigger ARP prioritization by monitoring different resources also called Monitored System Resources (MSR). MSR may include radio resources (e.g., PRB utilization, physical downlink/uplink control channel resources), computational resources (e.g., eNB baseband capacity utilization, scheduling entities or transmission time interval utilization) or bearer configuration related resources (e.g., maximum number of radio resource control (RRC) Connected UEs per cell (eNB), max numbers of active bearers per cell).

In existing cellular networks supporting D2D communications, a problem arises of how to prioritize among new cellular bearer requests, new D2D bearer requests, ongoing cellular bearers, and ongoing D2D bearers. In other words, a technical problem—specific to networks supporting D2D bearers—is how to enable the eNB to make retention and preemption decisions in case of congestion at the cellular layer and/or D2D layer. In a broader sense, a problem is how to manage (avoid or mitigate) congestion in integrated cellular-D2D networks. This problem is important in cellular-D2D networks, which support both commercial and mission critical (public safety) cellular and proximity services.

Existing radio resource management techniques concerned with radio resource allocation, power control, mode selection and scheduling typically focus on minimizing the impact of D2D communication on the cellular traffic, increasing the overall spectral and energy efficiency and handling seamless mobility between the cellular and D2D layers. Existing D2D radio resource management techniques assume that the D2D layer carries lower priority traffic and the cellular layer must be protected from interference caused by the D2D layer. Existing solutions, however, lack mechanisms that allow the eNB to manage congestion situations in integrated cellular-D2D networks. In known solutions for such networks, the D2D layer is given lower priority than the cellular layer and congestion primarily affects the D2D traffic, irrespectively of the importance of the ongoing or newly arriving cellular or D2D bearers.

Thus, a problem of existing technical solutions is that the radio access network lacks mechanisms to decide which cellular and D2D bearers should be retained/pre-empted in a congestion situation.

SUMMARY

Existing D2D mode selection techniques do not take into account the ARP levels of ongoing cellular and D2D bearers. Moreover, current solutions do not allow the operator to configure admission control parameters (e.g., the ARP values of D2D and cellular bearers) in order to properly balance the resource exploitation by D2D and regular cellular users. To address the foregoing problems in the prior art, disclosed is a network node for wireless communication between a wireless communication device and a network operable to assign resources for use in wireless communication. The network node is operable to receive, from a wireless communication device, a service request message that requests connection of a communication session. The network node is further operable to determine a priority level for the requested communication session. The priority level comprises a cellular layer admission priority of whether the network node can preempt cellular resources of an existing communication session in order to admit the requested communication session on the cellular layer, and a device-to-device (D2D) layer admission priority of whether the network node can preempt D2D resources of an existing communication session in order to admit the requested communication session on the D2D layer. The network node is further operable to assign resources based at least in part on the priority level, wherein the resources are used for D2D communication or cellular communication.

Also disclosed is a wireless communication device that is operable to send a service request message to a network node, wherein the service request message requests connection of a communication session and includes a priority level indicator for the requested communication session. The priority level indicator indicates a cellular layer admission priority to be used by the network node for determining whether the network node can preempt cellular resources of an existing communication session in order to admit the requested communication session on the cellular layer and a D2D layer admission priority to be used by the network node for determining whether the network node can preempt D2D resources of an existing communication session in order to admit the requested communication session on the D2D layer.

Also disclosed is a method in a network node for assigning resources for use in wireless communication. The method comprises receiving, from a wireless communication device, a service request message that requests connection of a communication session. The method further comprises determining a priority level for the requested communication session. The priority level comprises a cellular layer admission priority of whether the network node can preempt cellular resources of an existing communication session in order to admit the requested communication session on the cellular layer, and a device-to-device (D2D) layer admission priority of whether the network node can preempt D2D resources of an existing communication session in order to admit the requested communication session on the D2D layer. The method further comprises assigning resources based at least in part on the priority level, wherein the resources are used for D2D communication or cellular communication.

Also disclosed is a method in a wireless communication device. The method comprises sending a service request message to a network node, wherein the service request message requests connection of a communication session and includes a priority level indicator for the requested communication session. The priority level indicator indicates a cellular layer admission priority to be used by the network node for determining whether the network node can preempt cellular resources of an existing communication session in order to admit the requested communication session on the cellular layer, and a device-to-device (D2D) layer admission priority to be used by the network node for determining whether the network node can preempt D2D resources of an existing communication session in order to admit the requested communication session on the D2D layer.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
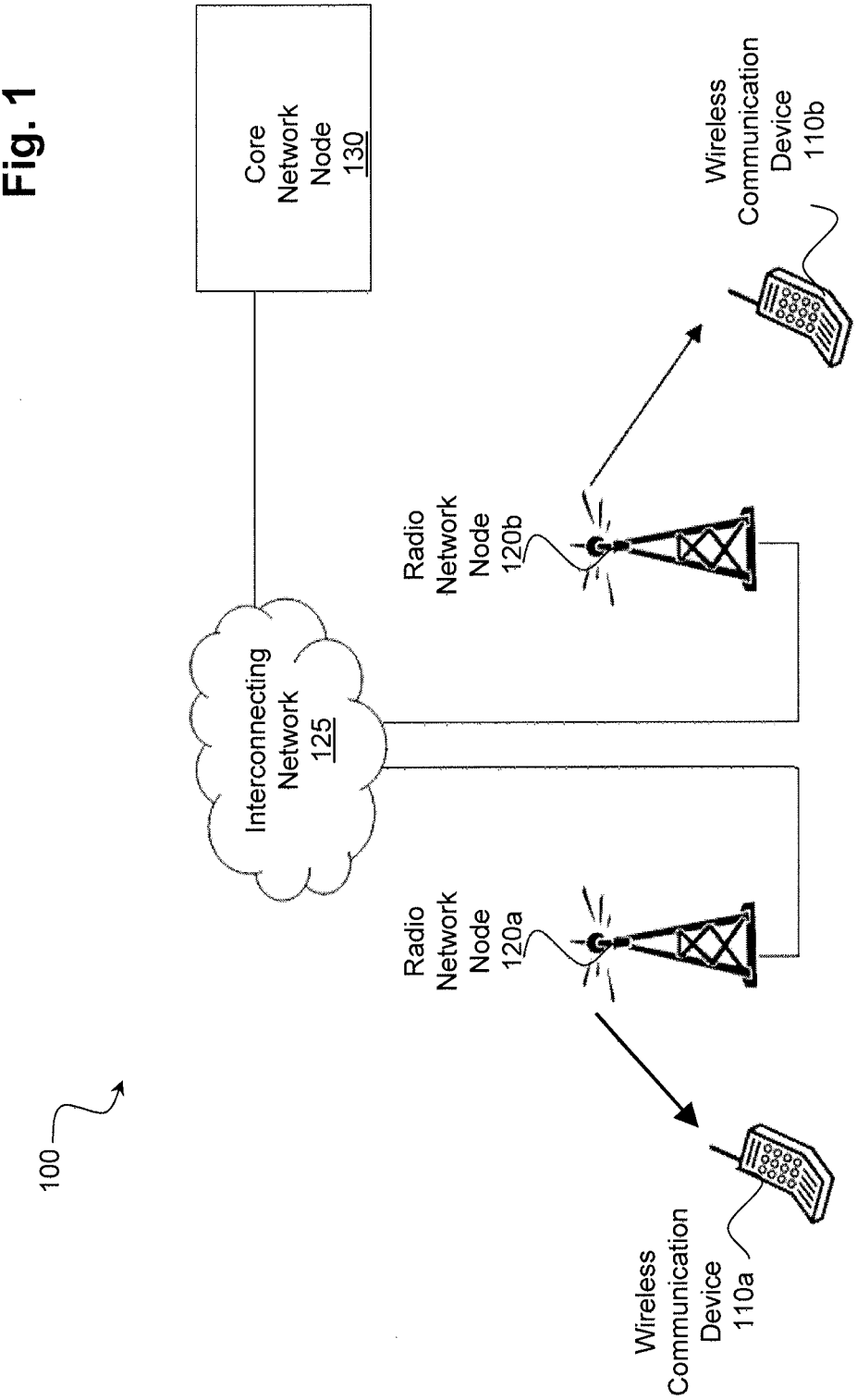
FIG. 1 is a block diagram of an exemplary wireless network.

As described in the background section above, a problem arises in existing cellular networks supporting D2D communications as to how to prioritize among new cellular bearer requests, new D2D bearer requests, ongoing cellular bearers, and ongoing D2D bearers. Particular embodiments of the present disclosure provide solutions to this problem.

For example, in some embodiments, a communication session "n" is associated with a priority level that describes the priority of communication session n with respect to the cellular layer and the D2D layer. The priority level can indicate a cellular layer admission priority (for determining whether the network node can preempt cellular resources of existing communication sessions in order to admit communication session n on the cellular layer), a D2D layer admission priority (for determining whether the network node can preempt D2D resources of existing communication sessions in order to admit communication session n on the D2D layer), a cellular layer pre-emptible priority (for determining whether the network node can preempt communication session n in order to admit a subsequent communication session on the cellular layer), and a D2D layer pre-emptible priority (for determining whether the network node can preempt communication session n in order to admit a subsequent communication session on the D2D layer).

Certain embodiments may use a new ARP indicator to indicate priority level information for the D2D layer. A D2D wireless communication device can signal the new ARP indicator directly to a radio network node during D2D radio bearer setup or to a core network node, which in turn requests the radio network node to setup the D2D radio bearer for the wireless communication device. The new ARP indicator can be used by the radio network node (e.g., eNB) for various purposes. As a first example, the new ARP indicator is used to reserve a set of resources for high priority cellular and D2D bearers. The amount of resources set aside for high priority bearers can be adjusted depending on the total amount of available resources (e.g., PHY resource blocks, hardware resources, transport network resources, etc.), current load situation (e.g., total active users currently used resource blocks, etc.), and interference levels (e.g., based on measured signal quality). As a second example, the new ARP indicator is used to make admission and preemption decisions both at the cellular and the D2D layers. In broad terms, lower priority bearer requests get rejected or pre-empted first, while higher priority bearer requests are granted or retained as long as there are lower priority ongoing bearers that can be preempted either at the cellular or the D2D layer.

In some embodiments, the priority level indicated by the new ARP indicator may allow the network node to determine whether to assign the wireless communication device a D2D communication resource or a cellular communication resource. The new ARP levels can also be used to take into account that some wireless communication devices may have a preference to use either D2D layer resources or cellular layer resources, while other wireless communication devices may not care which layer they use to communicate. If the wireless communication devices have preference for the cellular layer or the D2D layer, the priority level can be used to request that the wireless communication device be given higher priority on the layer it prefers to use. For example, a wireless communication device having a high D2D priority may be preferentially assigned D2D resources over wireless communication devices that have a lower D2D priority or do not care which layer they are assigned resources from. In some embodiments, the priority level may also allow the network to determine whether to preempt a wireless communication device with an existing communication session to ensure a higher priority wireless communication device is assigned resources in the layer it prefers. The ability to associate a priority for each communication layer with a wireless communication device may enable a user of a wireless communication device to pay extra for a high priority on a communication layer the user desires.

The new ARP levels can also be used for extended mode selection algorithms at the radio network node: high ARP level proximity services are granted orthogonal resources, while lower ARP level proximity services can be assigned to resources that are shared with ongoing cellular bearers. Likewise, the cellular bearers that share resources with D2D bearers in resource reuse mode are the ones with low priority. The basic is thus to use the extended ARP indicators to prioritize RBs both in terms of preemption/retention, resource allocation and D2D mode selection (e.g., reuse mode/orthogonal mode).

Particular embodiments of the solution include one or more of the following three parts. The first part is the necessary signaling mechanism and information elements that allow the wireless network node and/or the core network node to indicate to a radio network node the ARP level of a D2D or cellular resource request. The second part is an algorithm used by the radio network node (e.g., eNB) to make pre-emption/retention and resource allocation decisions in case of congestion. The third part is an extended mode selection algorithm that takes into account the ARP level and complements the second part.

FIG. 1 is a block diagram of an exemplary wireless network 100 that includes one or more wireless communication devices 110 and a plurality of network nodes. The network nodes include radio network nodes 120 and core network nodes 130. In the example, wireless communication device 110a communicates with radio network node 120a over a wireless interface. For example, wireless communication device 110a transmits wireless signals to radio network node 120a and/or receives wireless signals from radio network node 120a. The wireless signals may contain voice traffic, data traffic, and control signals.

A radio network node 120 refers to any suitable node of a radio access network (RAN)/base station subsystem (BSS). Examples include a radio access node (such as a base station or eNodeB) and a radio access controller (such as a base station controller or other node in the radio network that manages radio access nodes). Radio network node 120 interfaces (directly or indirectly) with core network node 130, for example, via an interconnecting network 125. Interconnecting network 125 refers to any interconnecting system capable of transmitting audio, video, signals, data, messages, or any combination of the preceding.

Core network node 130 manages the establishment of communication sessions and various other functionality for wireless communication device 110. Wireless communication device 110 exchanges certain signals with core network node 130 using a non-access stratum (NAS) layer. Using NAS signaling, signals between wireless communication device 110 and core network node 130 pass transparently through radio network nodes 120. Examples of wireless communication device 110, radio network node 120, and core network node 130 are described with respect to FIGS. 4, 5, and 6, respectively.

In general, embodiments of network 100 may assign resources to allow cellular and device to device (D2D) communication to wireless communication device 110. D2D communication allows two wireless communication devices 110 to communicate directly with each other using resources assigned by network node 120. Assigned resources may include radio resources, hardware resources, or transport network resources. Radio resources may include physical resources such as uplink resource blocks and downlink resource blocks. In certain embodiments use of D2D communications may require two wireless communication devices to be within a certain proximity of each other. D2D communication may allow for D2D resources to be reused for either cellular or D2D communication in a portion of a radio network cell that is distant from the area containing the two D2D wireless communication devices. In some embodiments, D2D resources may be assigned following a D2D discovery procedure that allows wireless communication device 110A to discover a local service provided by a peer device, such as wireless communication device 110B.

In some embodiments, network node 120 may assign resources to wireless communication devices 110 based on priority levels associated with the wireless communication devices 110. Priority levels may help ensure that a wireless communication device achieves a desired quality of service (QoS) when communicating wirelessly. For example, emergency personnel may use wireless communication devices 110 having a priority level that may cause the wireless communication devices 110 to preempt other, low priority wireless communication devices from either the cellular or D2D layer to ensure a consistent QoS. Priority levels may also ensure that a wireless communication device 110 is operating on a preferred layer (i.e., either the cellular layer or the D2D layer), which in turn may ensure that the wireless communication device 110 achieves a desired QoS.

Figure 8:
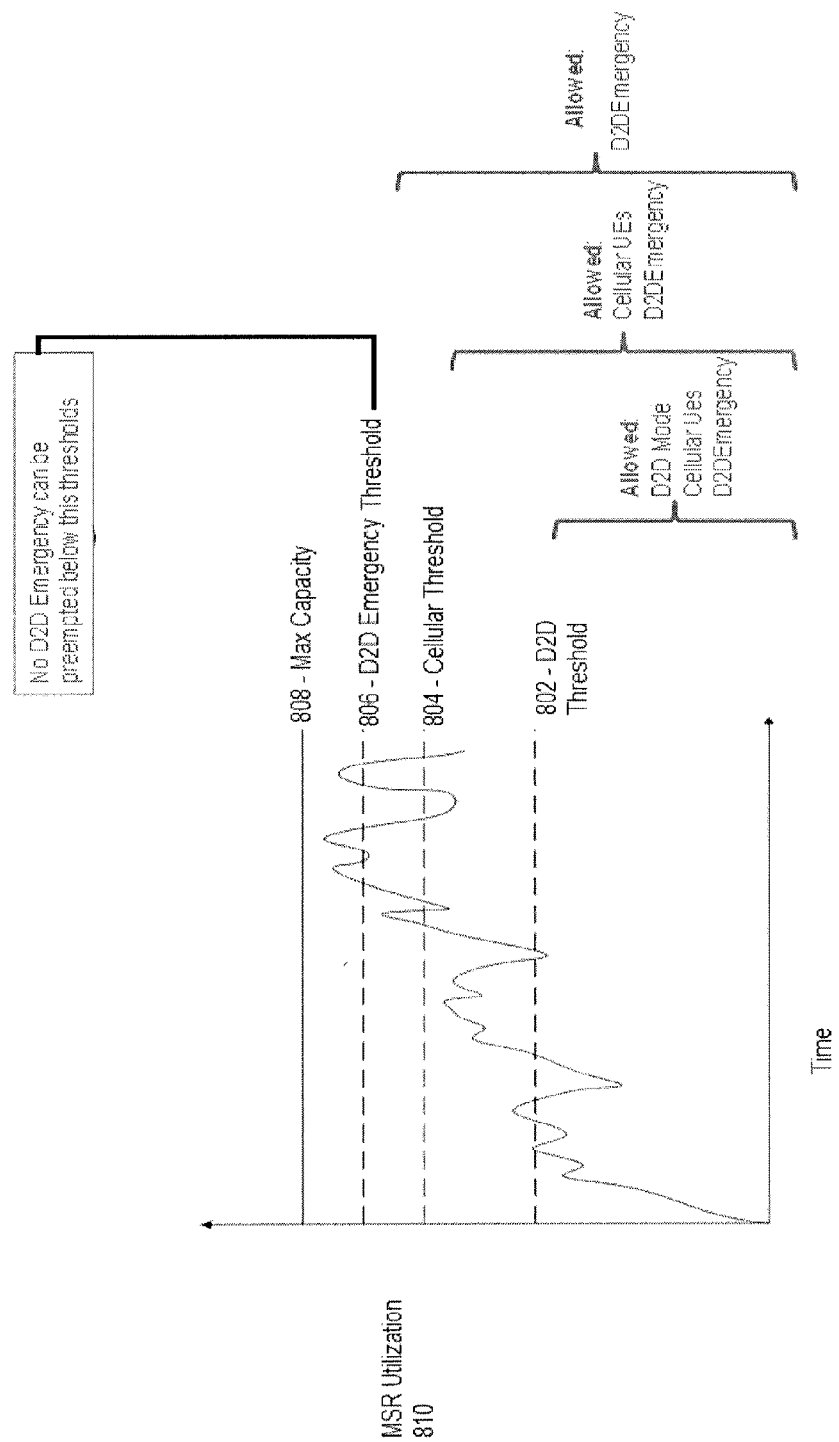
FIG. 8 illustrates example monitored system resource (MSR) threshold levels.

In some embodiments, network node 120 may apply priority levels of wireless communication devices 110 when assigning resources during the times that the wireless network is congested (i.e., there are less available resources than necessary to accommodate the QoS desired by all wireless communication devices 110). When the network is not congested, network node 120 may not need to apply priority levels because there may be sufficient resources available to satisfy the needs of wireless communication devices 110. When the network is congested, network node 120 may preempt low priority wireless communication devices 110 to ensure that QoS needs of high priority wireless communication devices 110 are satisfied. The criteria for congestions may be a number of active resources, such as resource blocks, and/or an amount of resources currently used in radio network node 120. Examples of resources are radio resources such as resource blocks, hardware resources such as memory and processor and transport network resources such as utilization of interfaces in the transport network. FIG. 8 below describes an example where congestion is assumed to occur if simultaneously active resources are above a threshold and/or one or more type of resources currently used are above their respective thresholds.

Figure 2:
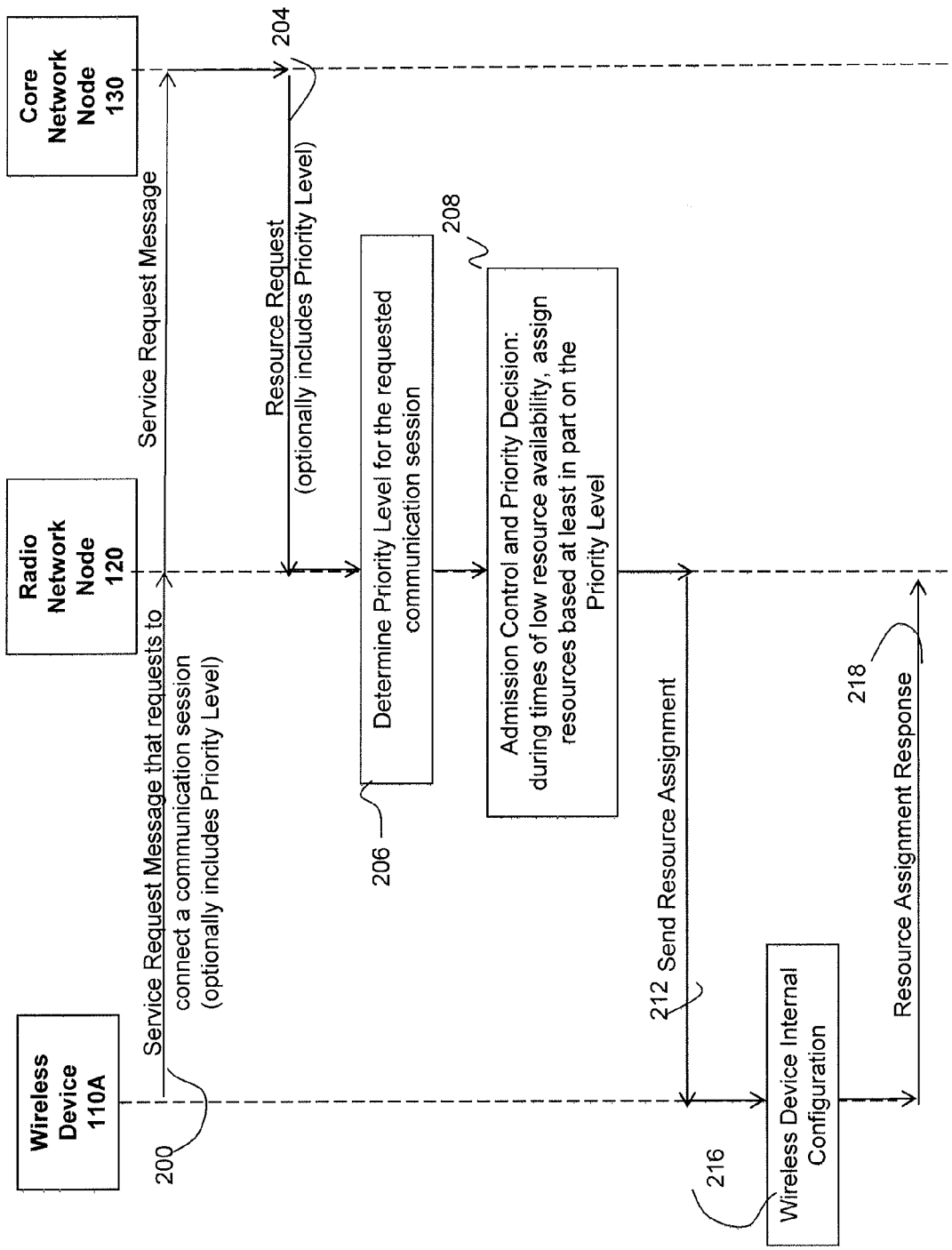
FIG. 2 illustrates an embodiment of a signaling mechanism to allow device-to-device (D2D) priority level indication.

FIG. 2 illustrates an embodiment of a signaling mechanism to allow D2D priority level indication as implemented by network 100. In the example of FIG. 2, wireless communication device 110A uses non access stratum signaling to send a service request message 200 to a core network node 130, such as an Application Server (AS) or Policy Control Function (PCRF), via radio network node 120. Wireless communication device 110A may be capable of cellular and D2D operation, and the service request message 200 requests to connect a communication session having a cellular or D2D bearer service.

Service request message may optionally include a priority level indicator, such as an allocation and retention priority (ARP) indicator. In general, the priority level indicator includes one or more of a cellular layer admission priority, a D2D layer admission priority, a cellular layer pre-emptible priority, and a D2D layer pre-emptible priority. The cellular layer admission priority indicates to radio network node 120 whether it can preempt cellular resources of existing communication sessions so that the communication session requested by wireless communication device 110A can be admitted on the cellular layer. The D2D layer admission priority indicates to radio network node 120 whether it can preempt D2D resources of existing communication sessions so that the communication session requested by wireless communication device 110A can be admitted on the D2D layer. In some embodiments the cellular layer admission priority and D2D admission layer priority may comprise a pre-emption capability indicator (PCI).

The cellular layer pre-emptible priority and D2D layer pre-emptible priority may refer to priorities that radio network node 120 uses to determine whether to preempt wireless communication device 110A after the communication session has been admitted (i.e., while the communication session for wireless communication device 110A is in-progress). The cellular layer pre-emptible priority indicates whether network node 120 may preempt the requested communication session (e.g., the communication session in-progress with wireless communication device 110A) in order to admit a subsequent communication session (e.g., a new communication session of another wireless communication device 110B) on the cellular layer. The D2D layer pre-emptible priority indicates whether network node 120 may preempt the requested communication session (e.g., the communication session in-progress with wireless communication device 110A) in order to admit a subsequent communication session (e.g., a new communication session of another wireless communication device 110B) on the D2D layer. In some embodiments the cellular layer pre-emptible priority and the D2D layer pre-emptible priority may comprise a pre-emption vulnerability indicator (PVI). Examples of the priority level indicator are further described with respect to Table 1 and Table 2 below.

In response to receiving service request 200, in some embodiments, core network node 130 may determine a priority level associated with service request 200. The priority level corresponds to the priority level indicated by service request 200 or, if service request 200 did not include an indication of the priority level, core network node 130 may look up a priority level assigned to a wireless communication device 110A. Core network node can look up the priority level based on the identity of wireless communication device 110A, based on the type of service requested by wireless communication device 110A (such as a voice service, a streaming data service, or a non-streaming data service), based on other suitable information, or based on any combination of the preceding.

Core network node 130 stores and processes the information received in service request 200 and/or the information determined in response to receiving service request 200 and uses the information for communicating with other network nodes. For example, if core network node 130 determines to grant service request 200, core network node 130 can send a resource request 204 to radio network node 120 based on service request 200. In some embodiments, core network node 130 may send the resource request 204 to radio network node 120 via a second core network node 130 (e.g., an AS or PCRF may send resource request 204 to radio network node 120 via a Mobility Management Entity MME (not illustrated) that requests radio network node 120 to setup a radio bearer for wireless communication device 110A). Resource request 204 optionally includes the priority level.

At step 206, radio network node 120 may determine a priority level for the communication session requested in resource request 204. The determination may be made based on explicit priority level information (e.g., when service request 200 or resource request 204 includes the priority level information), or the determination may be made based on implicit information (such as a profile that network node 120 associates with wireless communication device 110A). Radio network node 120 makes an admission control and priority decision 208 to decide whether or not to admit wireless communication device 110A based on the priority level as well as the availability of resources in the downlink and/or the uplink, the signal quality in the downlink and/or the uplink, and/or the cell load in the downlink and/or the uplink.

If radio network node 120 determines to admit the communication session, it assigns resources to wireless communication device 110A based at least in part on the priority level. Examples of assigned resources may include radio resources, hardware resources, transport network resources, or other monitored resources. Radio resources may include physical resources such as uplink resource blocks and downlink resource blocks. In a particular embodiment, assignment decision 208 may be made following the process described with respect to FIG. 7.

After determining the resource assignment at step 208, network node 120 sends resource assignment 212 to wireless communication device 110A. Resource assignment 212 indicates the resources that radio network node 120 has assigned to wireless communication device 110A. Wireless communication device 110A performs an internal configuration 216 to be able to communicate using the resources assigned by resource assignment 212. After configuring itself, wireless communication device 110A sends a resource assignment response 218 to radio network node 120 to acknowledge the assignment of resources by resource assignment 212.

In the preceding example, radio network node 120 admits the communication session of wireless communication device 110A provided there are sufficient resources at radio network node 120. In case there are insufficient resources then, depending on APR levels of the communication session requested by wireless communication device 110A and also the existing communication sessions with other D2D and/or non-D2D wireless communication devices 110, one or more existing radio bearer may be relieved (pre-empted) to release resources for admitting the new communication session requested by wireless communication device 110A in service request 200. Therefore, for accepting the radio bearer setup request for wireless communication device 112A, the radio network node further takes into account the ARP information of the existing D2D wireless communication devices 110 (i.e., devices having radio bearers setup) and/or of the existing non-D2D wireless communication devices 110 served by the radio network node. This is further explained below based on the ARP examples in Table 1 below, which provides an example of priority levels:

TABLE 1

Examples of priority levels that can be used in the signalling mechanism shown by FIG. 2.

| Allocation Retention Priority Level (ARP) | Cell Layer Admission Priority (Admission to Cellular Layer) | Cell Layer Pre-emptible Priority (Preemption from Cellular Layer) | D2D Layer Admission Priority (Admission to D2D Layer) | D2D Layer Pre-emptible Priority (Preemption from D2D Layer) |
|---|---|---|---|---|
| High All | High | Not Accepted | High | Not Accepted |
| High Cellular | High | Not Accepted | Low | Accepted to Cellular Layer |
| High D2D | Low | Accepted to D2D Layer | High | Not Accepted |
| Best Effort - Discovery Only | Low/Not Requested | Accepted | Low -Need access to Peer Discovery Resources Only | Accepted |
| Best Effort All | Low | Low | Low | Low |

Five priority levels are shown in Table 1: High All, High Cellular, High D2D, Best Effort—Discovery Only, and Best Effort All. The "High All" priority level may indicate that wireless communication device 110A should be admitted into the system with high probability irrespective of the communication mode (cellular or D2D) that the radio network node 120 decides for the resource assigned to wireless communication device 110A. In response to a "High All" service request, network node 120 may preempt other users of either cellular or D2D resources in order to ensure that wireless communication device 110A is assigned resources. After resources are assigned, network node 120 may not allow another wireless communication device 110B to preempt wireless communication device 110A having a priority level of "High All" from either D2D or cellular resources.

"High Cellular" priority level may indicate that wireless communication device 110A requests resources primarily at the cellular layer but, in case of congestion, it can accept the allocation of D2D resources as well. In other words, wireless communication device 110A with a priority level of "High Cellular" prefers to be assigned D2D resources over being pre-empted.

"High D2D" priority level may indicate that wireless communication device 110A requests resources primarily at the D2D layer but, in case of congestion, it can accept the allocation of cellular resources as well. In other words, wireless communication device 110A with a priority level of "High D2D" prefers to be assigned cellular resources over being pre-empted.

The "Best Effort—Discovery Only" priority level may indicate that wireless communication device 110A requires access to D2D discovery resources only and that it accepts pre-emption in case of congestion in the radio access network.

The "Best Effort All" priority is an indication that wireless communication device 110A requests service from either cellular layer resources or D2D resources on a best effort basis. It also accepts preemption in case of congestion or when network node 120 must provide quality of service (QoS) guarantees to high priority users. A service request 200 with a priority level of "Best Effort All" may not cause network node 120 to preempt other wireless communication device using either cellular or D2D communications.

The finer level of granularity of ARP indicators allows wireless communication devices 110 to request low cost bearer services and to explicitly indicate whether they request a cellular or a D2D service (with certain priority for each). The ARP indicators allow the network to preempt users who accept such preemption and protect users who wish to retain their bearer service even in case of congestion.

Table 2 shows examples of corresponding types service that wireless communication devices 110A may be used for and the priority levels shown in Table 1.

D2D layer in order to admit the subsequent cellular communication session (wireless communication device 110B) on the cellular layer.

As another example, in some embodiments, a request for a high priority cellular service may be given priority over lower priority cellular services and any D2D services. Thus, if the cellular layer admission priority of the communication session requested by wireless communication device 110A in service request 200 is higher than a cellular layer pre-emptible priority of an existing cellular communication session of another wireless communication device 110B, radio network node is allowed to preempt the existing cellular communication session (wireless communication device 110B) or an existing D2D communication session (e.g., an existing D2D communication session of a third wireless communication device 110C) in order to admit the requested communication session (wireless communication device 110A) on the cellular layer.

TABLE 2

Examples of mapping between priority levels and wireless communication device services.

| Priority Level | Service Example | Service Example Comments |
|---|---|---|
| High All | First responder officer in security and public safety, subscriber with high QoS subscription. | Mode selection between cellular and D2D layer is determined based on radio conditions. That is, preemption to/from cellular and D2D layers based on priority is not applied to this type of wireless communication device. |
| High Cellular | Subscriber with a high priority (e.g., "gold") subscribption to cellular services, but with a low priority (e.g., is "not interested") subscription to proximity services | This category of wireless communication devices prefer cellular resources but accept D2D resources in cases of network congestion, even if switching to D2D resourses may affect quality of service. |
| High D2D | Subscriber with a high priority (e.g., "gold") subscriber to D2D services. For example, proximity social services with low delay requirements for peer-to-peer services such as gaming. | This class of wireless communication devices are associated with users who prefer (will pay for) access to high quality D2D services. This class of wireless communication devices will accept cellular layer resources in cases of network congestion. |
| Best Effort - Discovery Only | Wireless communication devices that advertise small pieces of information to enable other wireless communication devices to discover services offered by these wireless communication devices | This class of wireless communication devices may be devices like automatic teller machines or medical devices that have a high priority for detection by other devices |
| Best Effort All | Subscribers who want to minimize their subscription fees and accept preemption or service degregation if the network is congested | May be preempted by any device having a higher priority. |

The priority level from the above-described ARP indicators may be used to prioritize communication sessions in any suitable manner. As an example, in some embodiments, if the cellular layer pre-emptible priority of the communication session requested by wireless communication device 110A in service request 200 is lower than a cellular layer admission priority of a subsequent cellular communication session requested by another wireless communication device 110B, radio network node 120 is allowed to preempt wireless communication device 110A from the cellular layer to the As another example, in some embodiments, a request for a high priority D2D service may be given priority over lower priority D2D services but may not be given priority over any cellular services. Thus, if the D2D layer admission priority of the communication session requested by wireless communication device 110A in service request 200 is higher than a D2D layer pre-emptible priority of an existing D2D communication session of another wireless communication device 110B, radio network node is allowed to preempt the existing D2D communication session (wireless communication device 110B) in order to admit the requested communication session (wireless communication device 110A) on the D2D communication layer. However, radio network node 120 is not allowed to preempt an existing cellular communication session of a third wireless communication device 110C because, in the example, cellular communications have higher priority than D2D communications.

As another example, in some embodiments, if the cellular layer admission priority of the communication session requested by wireless communication device 110A in service request 200 is lower than cellular layer pre-emptible priorities of existing cellular communication sessions and the D2D layer admission priority of the requested communication session is lower than D2D layer pre-emptible priorities of existing D2D communication sessions, radio network node 120 rejects the requested communication session (wireless communication device 110A is not admitted). Thus, the higher existing cellular communication sessions and the higher priority existing D2D communication sessions are not preempted.

Figure 3:
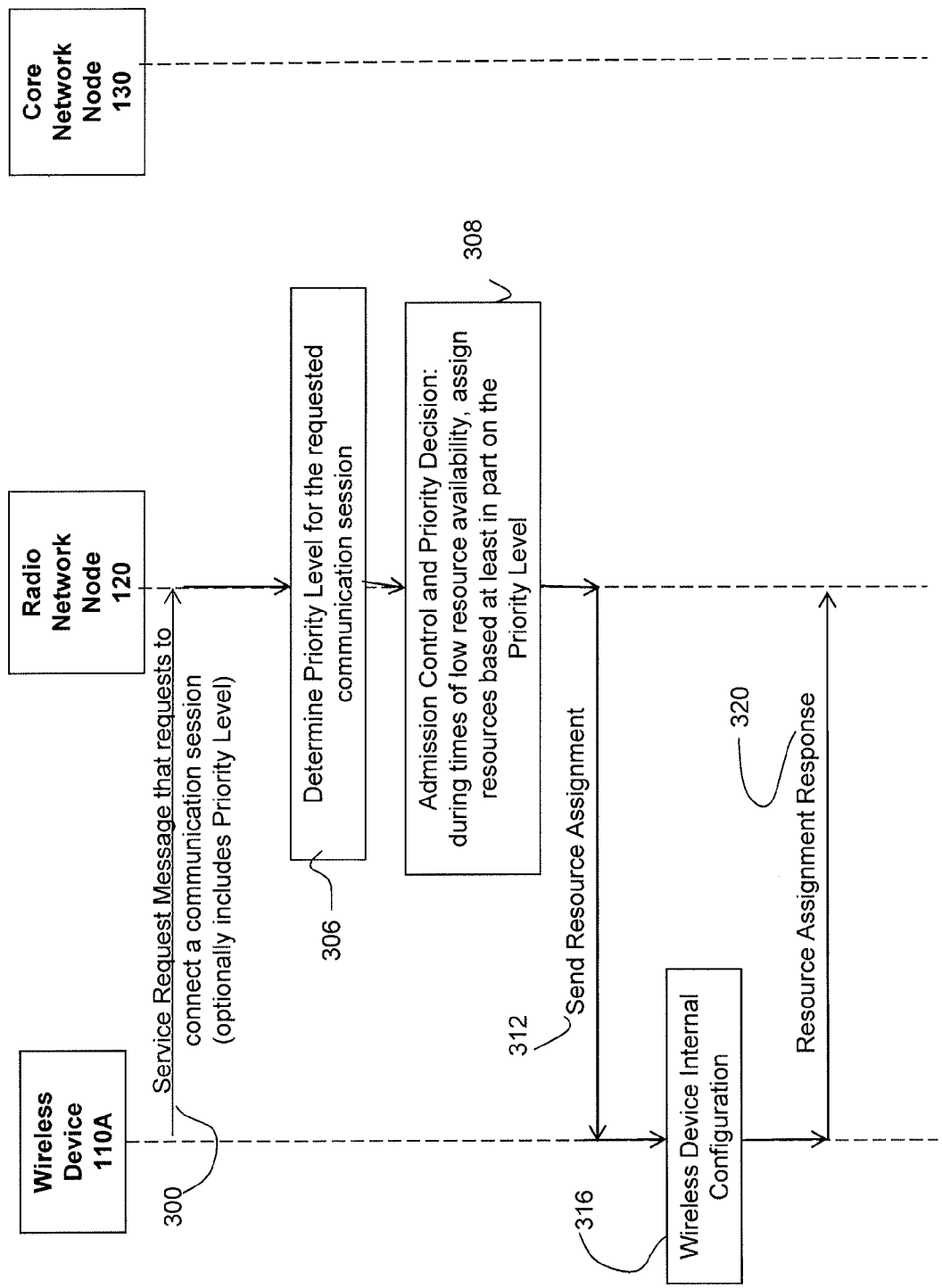
FIG. 3 illustrates an embodiment of a signaling mechanism in which a service request is not forwarded to the core network.

FIG. 3 illustrates an embodiment of a signaling mechanism similar to the signaling mechanism illustrated in FIG. 2 in which service request 300 is not forwarded to the core network by radio network 120. Step 300, 306, 308, 312, 316, and 320 of FIG. 3 may be analogous to steps 200, 206, 208, 212, 216, and 220 of FIG. 2, respectively. In the embodiment illustrated in FIG. 3, radio network node 120 is able to perform certain functions of core network node 130 as described with respect to FIG. 2, such as determining the priority level based on service request 300 and assigning resources based at least in part on the determined priority level. In some embodiments, the signaling mechanism of FIG. 3 may be used when wireless communication device 110A requests to establish a radio bearer to a local D2D peer.

As described with respect to FIG. 1, embodiments of network 100 can include one or more wireless communication devices 110, and one or more different types of network nodes capable of communicating (directly or indirectly) with wireless communication devices 110. Examples of the network nodes include radio network nodes 120 and core network nodes 130. The network may also include any additional elements suitable to support communication between wireless communication devices 110 or between a wireless communication device 110 and another communication device (such as a landline telephone).

Wireless communication device 110, radio network node 120, and core network node 130 use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies. The scope of the disclosure, however, is not limited to the examples and other embodiments could use different radio access technologies. Each of wireless communication device 110, radio network node 120, and core network node 130 include any suitable combination of hardware and/or software. Examples of particular embodiments of wireless communication device 110, radio network node 120, and core network node 130 are described with respect to FIGS. 4, 5, and 6 below, respectively.

Figure 4:
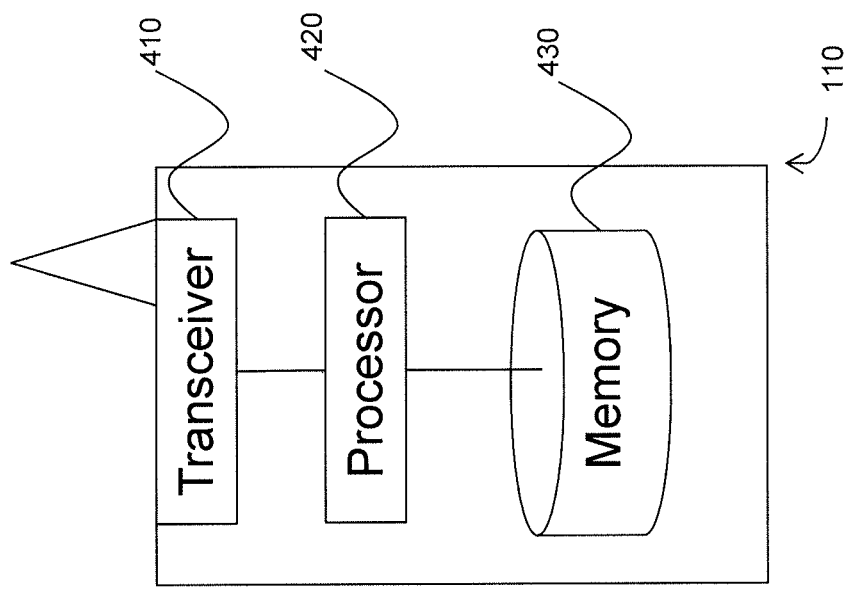
FIG. 4 is a block schematic of an exemplary wireless communication device suitably operative in accordance with the principles of the invention.

FIG. 4 is a block schematic of an exemplary wireless communication device 110 suitably operative in accordance with the principles of the invention. Examples of wireless communication device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. Wireless communication device 110 includes transceiver 410, processor 420, and memory 430. In some embodiments, transceiver 410 facilitates transmitting wireless signals to and receiving wireless signals from radio network node 120 (e.g., via an antenna), processor 420 executes instructions to provide some or all of the functionality described herein as provided by a wireless communication device 110, and memory 430 stores the instructions executed by processor 420.

Processor 420 includes any suitable combination of hardware and software implemented in one or more integrated circuits or modules to execute instructions and manipulate data to perform some or all of the described functions of wireless communication device 110. Memory 430 is generally operable to store computer executable code and data. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless communication device 110 include additional components beyond those shown in FIG. 4 responsible for providing certain aspects of the wireless communication device's functionality, including any of the functionality described above and/or any additional functionality including any functionality necessary to support the solution described above.

In some embodiments, wireless communication device 110 may comprise a module for sending a service request message to a network node 120, wherein the service request message requests connection of a communication session and includes a priority level indicator for the requested communication session. The priority level indicator may indicate a cellular layer admission priority to be used by the network node for determining whether the network node can preempt cellular resources of an existing communication session in order to admit the requested communication session on the cellular layer, and a device-to-device (D2D) layer admission priority to be used by the network node for determining whether the network node can preempt D2D resources of an existing communication session in order to admit the requested communication session on the D2D layer.

Figure 5:
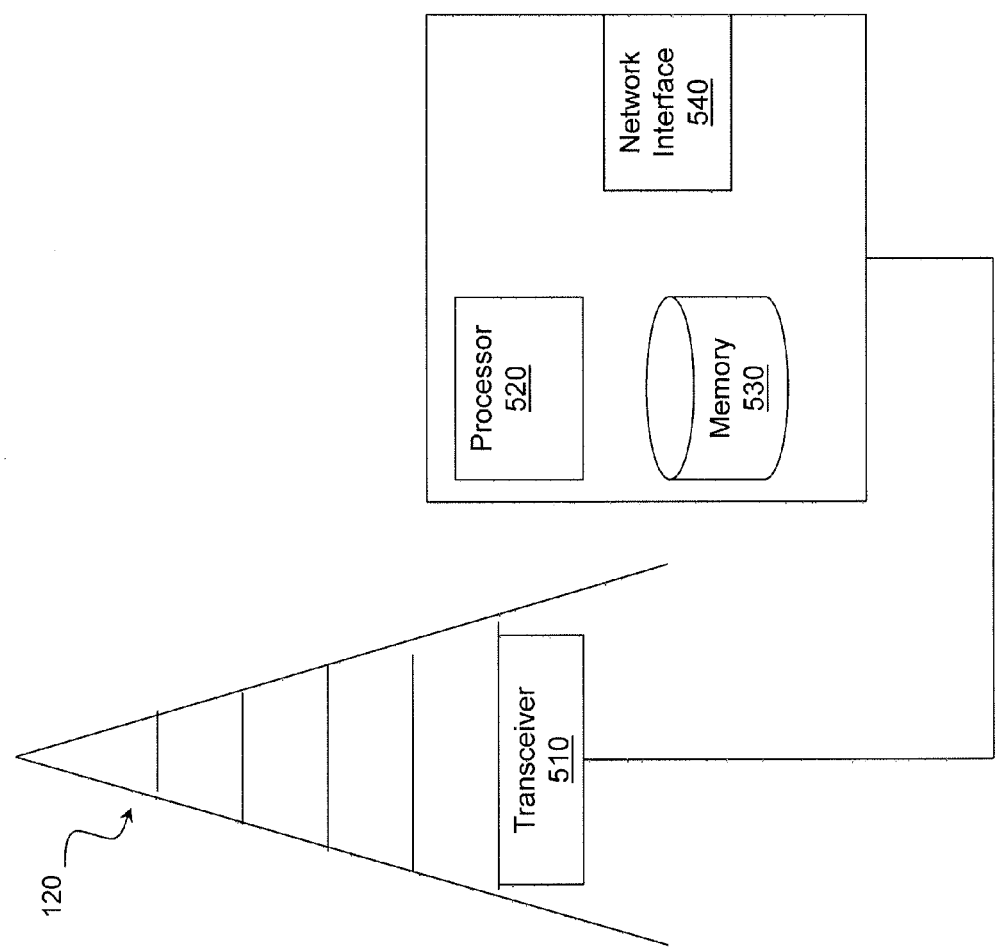
FIG. 5 is a block schematic of an exemplary radio network node suitably operative in accordance with the principles of the invention.

FIG. 5 is a block schematic of an exemplary radio network node 120 suitably operative in accordance with the principles of the invention. Radio network node 120 can be, for example, a radio access node, such as an eNodeB, a node B, a base station, a wireless access point (e.g., a Wi-Fi access point), a low power node, a base transceiver station (BTS), a transmission point or node, a remote RF unit (RRU), or a remote radio head (RRH). Other radio network nodes 120, such as one or more radio network controllers, can be configured between the radio access nodes and core network nodes 130. Such other radio network nodes 120 can include processors, memory, and interfaces similar to those described with respect to FIG. 5; such other radio network nodes, however, might not necessarily include a wireless interface, such as transceiver 510.

Radio network node 120 includes at least one processor 520, at least one memory 530, and at least one network interface 540; in certain embodiments, radio network node 120 can also include a transceiver 510. Transceiver 510 facilitates transmitting wireless signals to and receiving wireless signals from wireless communication device 110 (e.g., via an antenna); processor 520 executes instructions to provide some or all of the functionality described above as being provided by a radio network node 120; memory 530 stores the instructions executed by processor 520; and network interface 540 communicates signals to backend network components, such as a gateway, switch, router, Internet, Public Switched Telephone Network (PSTN), other radio network nodes 120, and/or core network nodes 130. The processor 520 and memory 530 can be of the same types as described supra with respect to FIG. 4.

In some embodiments, network interface 540 is communicatively coupled to processor 520 and refers to any suitable device operable to receive input for radio network node 120, send output from radio network node 120, perform suitable processing of the input or output or both, communicate to other devices, or any combination of the preceding. Network interface 540 includes appropriate hardware, e.g., port, modem, or network interface card, and software, including protocol conversion and data processing capabilities, to communicate through a network.

Other embodiments of radio network node 120 include additional components beyond those shown in FIG. 5 responsible for providing certain aspects of the radio network node's functionality, including any of the functionality described above and/or any additional functionality including any functionality necessary to support the solution described above. The various different types of radio access nodes may include components having the same physical hardware but configured, e.g., via programming, to support different radio access technologies, or may represent partly or entirely different physical components.

In some embodiments, network node 120 may be a network node for wireless communication between a wireless communication device and a network operable to assign resources for use in wireless communication. Network node 120 may comprise a module for receiving, from a wireless communication device 110A, a service request message that requests connection of a communication session; a module for determining a priority level for the requested communication session; and a module for assigning resources based at least in part on the priority level, wherein the resources are used for D2D communication or cellular communication. The priority level may comprise a cellular layer admission priority of whether the network node can preempt cellular resources of an existing communication session in order to admit the requested communication session on the cellular layer; and a device-to-device (D2D) layer admission priority of whether the network node can preempt D2D resources of an existing communication session in order to admit the requested communication session on the D2D layer.

In some embodiments, network node 120 may also comprise a module for monitoring a monitored system resource (MSR) utilization; and a module for determining to apply the priority level in response to the MSR utilization exceeding a threshold. In particular embodiments, network node 120 may also comprise: a module for monitoring a monitored system resource (MSR) utilization; a module for determining that the MSR utilization is below a D2D threshold; a module for assigning D2D resources to the requested communication session; a module for, after assigning the D2D resources to the requested communication session, determining that the MSR utilization exceeds the D2D threshold and is below a cellular threshold; a module for preempting resources from existing low priority D2D communication sessions and reallocate the resources to the cellular layer; and a module for moving the requested communication session from the D2D layer to the cellular layer if the requested communication session has high enough priority with respect to the cellular layer.

Figure 6:
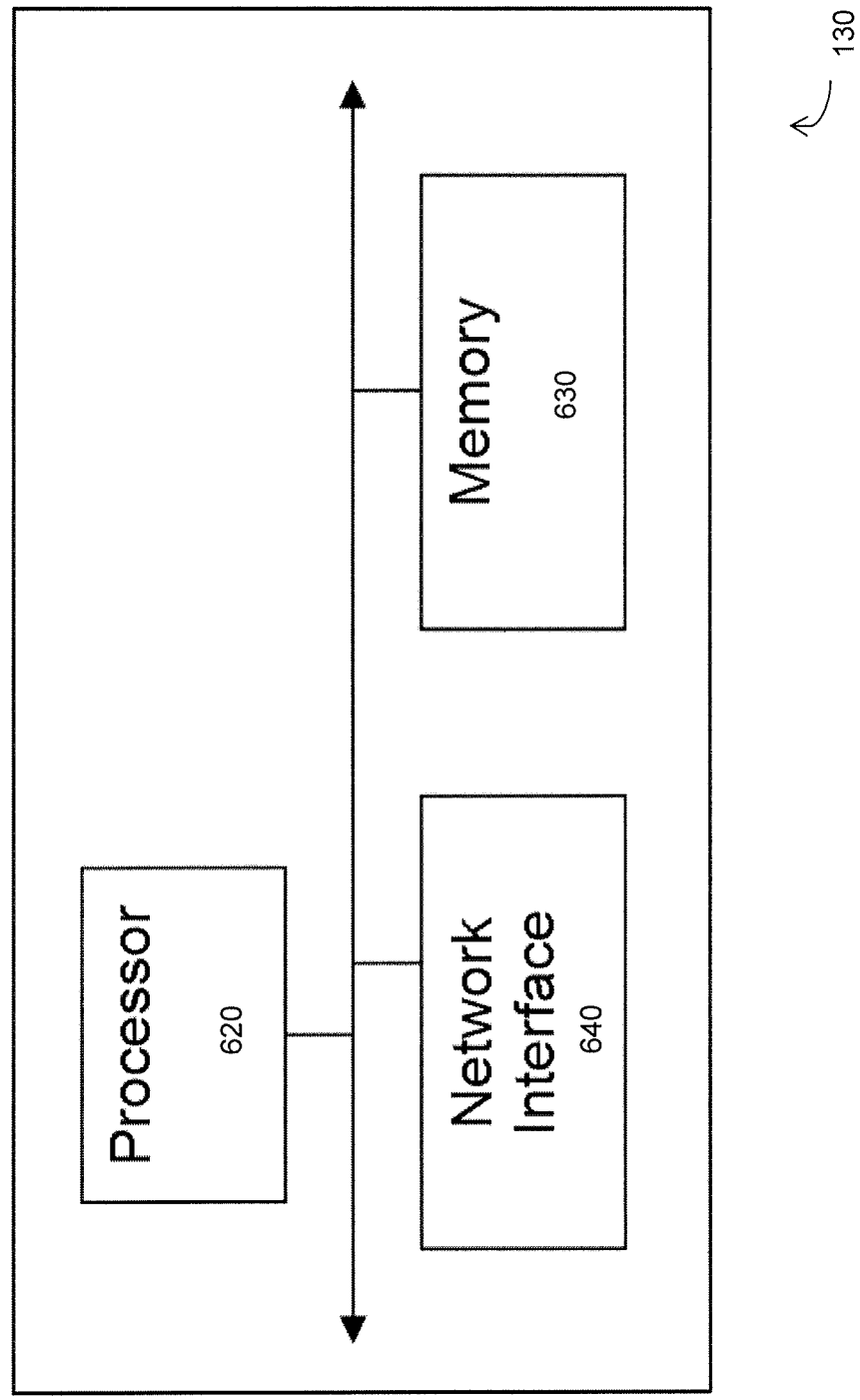
FIG. 6 is a block schematic of an exemplary core network node suitably operative in accordance with the principles of the invention.

FIG. 6 is a block schematic of an exemplary core network node 130 suitably operative in accordance with the principles of the invention. Examples of a core network node 130 include, but are not limited to, a mobile switching center (MSC), a serving GPRS support node (SGSN), a mobility management entity (MME), a radio network controller (RNC), a base station controller (BSC). Core network node 130 includes processor 620, memory 630, and network interface 640. Processor 620 executes instructions to provide some or all of the functionality described above as being provided by core network node 130; memory 630 stores the instructions executed by processor 620; and network interface 640 communicates signals to other network nodes. The processor 620 and memory 630 can be of the same types as described supra with respect to FIG. 4.

In some embodiments, network interface 640 is communicatively coupled to processor 620 and may refer to any suitable device operable to receive input for core network node 130, send output from core network node 130, perform suitable processing of the input or output or both, communicate to other devices, or any combination of the preceding. Network interface 640 includes appropriate hardware, e.g., port, modem, or network interface card, and software, including protocol conversion and data processing capabilities, to communicate through a network. Other embodiments of core network node 130 include additional components beyond those shown in FIG. 6 responsible for providing certain aspects of the core network node's functionality, including any of the functionality described above and/or any additional functionality including any functionality necessary to support the solution described above.

Figure 7:
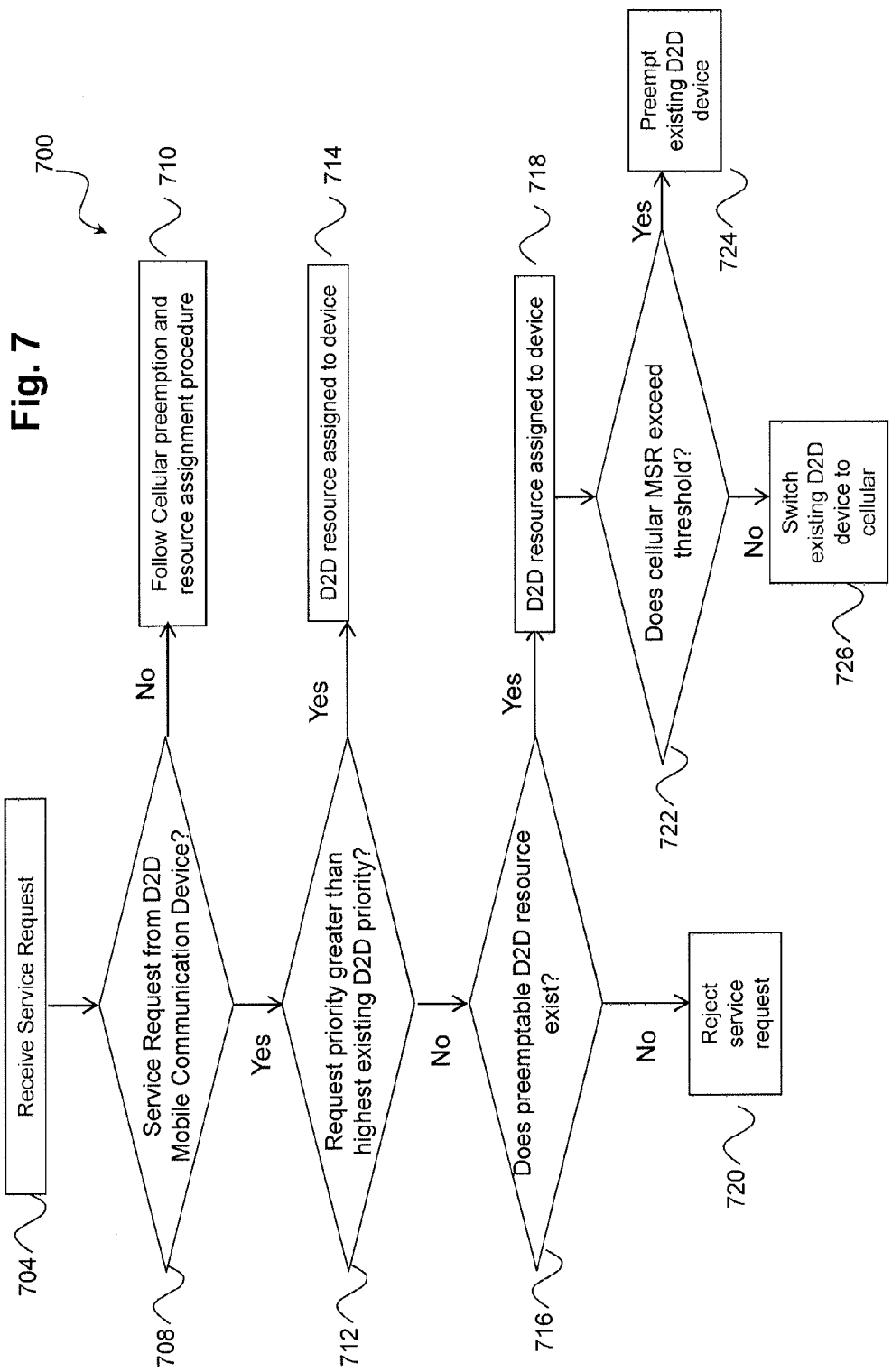
FIG. 7 illustrates an example method for performing D2D resource assignment based on priority level.

FIG. 7 illustrates an example method 700 for performing D2D resource assignment based on priority level. In one embodiment, method 700 may be implemented by network node 120 of FIG. 1. Method 700 may only apply when the network of FIG. 1 is congested, that is, there are more users than available resources. Congestion can be determined using Monitored System Resources (MSR) utilization. For example, radio network node 120 keeps track of the MSR utilization for one or more resources, such as radio resources (e.g., uplink resource blocks and downlink resource blocks), hardware resources, transport network resources, and any resources specific to D2D communications (e.g., number of D2D bearers or the number of PRBs used/available for D2D communications). If any of the MSR utilization exceeds a predefined threshold, the ARP differentiation is triggered (i.e., the priority levels of new service requests and existing services are used to determine which resources can and cannot be preempted). The predefined threshold can be configured by the operator on a static or dynamic basis, and any suitable number of thresholds may be defined. Thus, different thresholds could be defined for different resources or different threshold could be defined to take different actions (e.g., if a lower MSR utilization threshold is exceeded, radio network node takes moderate action to reduce congestion and if a higher MSR utilization threshold is exceeded, radio network node takes more aggressive action to reduce congestion).

As an example of using an MSR utilization threshold, radio network node 120 may use a timer having a value of on the order of hundreds of milliseconds (or other suitable value) to periodically compare D2D MSR utilization to a D2D admission control threshold. If the D2D MSR utilization exceeds the D2D admission control threshold, radio network node 120 determines whether new sessions can be admitted to and/or existing sessions can be preempted from the D2D layer based on priority level. Similarly, radio network node 120 may use a timer having a value of on the order of hundreds of milliseconds (or other suitable value) to periodically compare cellular MSR utilization to a cellular admission control threshold. If the cellular MSR utilization exceeds the cellular admission control threshold, radio network node 120 determines whether new sessions can be admitted to and/or existing sessions can be preempted from the cellular layer based on priority level.

Method 700 may begin at step 704 wherein a service request from a wireless communication device is received. In certain embodiments the service request may include a priority level. At step 708, method 700 determines whether the service request is for a wireless communication device 110 requesting D2D resources. If the service request is not for D2D resources a cellular specific preemption and resource assignment procedure will be followed at step 710. If the service request is for D2D resources, the priority level of the service request is compared to that of current D2D devices at step 712. If the service request has a higher priority level than a wireless communication device with highest existing D2D priority, the device sending the service request will be assigned D2D resources at step 714. For example, if the service request has a priority of "High D2D" and all current devices using the network have a priority level of "Best Effort—Discovery Only" or "Best Effort—All" the requesting device will preempt a lower priority device and be assigned a D2D resource.

If the service request does not have a higher priority than the wireless communication device with the highest priority currently using D2D resources, method 700 determines whether a preemptable D2D resource exists at step 716. If a device with a preemptable D2D resource (i.e., a device with a lower D2D priority) exists, the requesting device is assigned a D2D resource at step 718. When the requesting device is assigned a D2D resource method 700 determines, at step 722, whether a cellular monitored system resource (MSR) threshold is exceeded. If the cellular MSR threshold is exceeded, method 700 will preempt an existing lower priority D2D device to assign its D2D resources to the requesting device at step 724. If the cellular MSR level is not exceeded, method 700 will switch an existing D2D device to cellular layer resources and assign the existing D2D device's D2D resources to the requesting device at step 726. In certain embodiments, steps equivalent to steps 722, 724, and 726 may follow step 714 to determine if the preempted lower priority D2D device may be assigned a cellular layer resource.

If no pre-emptible D2D resources exist (i.e., existing D2D devices have a higher D2D priority than the requesting device) and no resources are available (e.g., either the cellular MSR threshold or D2D MSR thresholds are exceeded as described below with respect to FIG. 8), method 700 will reject the service request at step 720.

FIG. 8 illustrates an example of monitored system resource (MSR) utilization 810 and threshold levels. In some embodiments, MSR thresholds may be used to determine if a wireless communication device 110A may preempt another wireless communication device 110B. In some embodiments MSR utilization 810 may be a measurement of the amount of resources available to network node 120 that are currently in use by wireless communication devices 110. In a particular embodiment, when assigning resources to a wireless communication device 110A that has requested service, network node 120 may determine to apply a priority level of wireless communication device 110A in response to the MSR utilization 810 exceeding a threshold. In such an embodiment, network node 120 may use priority level to determine whether or not to assign wireless communication device 110A resources and to determine whether or not to preempt another wireless communication device 110B in order to free up resources to assign to wireless communication device 110A.

For example, if MSR utilization 810 is below a D2D threshold 802, network node 120 may assign D2D layer or cellular layer resources to wireless communication device 110 regardless of the priority level associated with wireless communication device 110. For purposes of example, suppose network node 120 has assigned a particular wireless communication device 110A to the D2D layer. If after assigning wireless communication device 110A to the D2D layer, the MSR utilization 810 increases to exceed D2D threshold 802 (but remains below cellular threshold 804), network node 120 may preempt D2D resources from existing low priority D2D communication sessions and reallocate the resources to the cellular layer. In some embodiments, low priority D2D communication sessions may include any D2D communication session other than emergency D2D sessions (such as E911 D2D sessions). Thus, as long as MSR utilization 810 exceeds D2D threshold 802, network node may determine to de-allocate and to not admit any non-emergency D2D resources.

With respect to the particular wireless communication device 110A, recall that in the example it was initially assigned to the D2D layer. When MSR utilization 810 exceeds D2D threshold 802 (but remains below cellular threshold 804), network node 120 may proceed according to one of three options. First, network node 120 may maintain wireless communication device 110A on the D2D layer if wireless communication device 110A is in an emergency session. Second, network node may move wireless communication device 110A from the D2D layer to the cellular layer if wireless communication device 110A's communication session has a higher cellular layer priority than the other existing sessions of network node 120. Third, network node may preempt wireless communication device 110A if wireless communication device 110A's communication session has a lower cellular layer priority than the other existing sessions of network node 120 (resources can be de-allocated from wireless communication device 110A on the D2D layer and reallocated to another wireless communication device 110 on the cellular layer).

If MSR utilization 810 increases beyond cellular threshold 804, non-emergency wireless communication devices 110 may be preempted from both the cellular and D2D according to priority. If MSR utilization 810 increases beyond D2D emergency threshold 806, D2D emergency sessions may be moved to cellular resources. If MSR utilization 810 exceeds max capacity threshold 808, radio network node 120 may preempt and/or deny admission to any type of call based on priority.

In case of local (proximity) services pre-emption can also mean pre-emptying a resource to the D2D layer from the cellular layer (or to the cellular layer from the D2D layer). For example, if ongoing resource bearers (RBs) are established to allow two wireless communication devices in close proximity to communicate with one another (that is, the two wireless communication devices communicate at the cellular layer through the network node, each having its RB to the network node), those RBs can be pre-empted by the radio network node in case of congestion at the cellular layer to the D2D layer.

This type of pre-emption can imply some QoS service degradation if the D2D bearer shares resources with other D2D bearers or with ongoing cellular bearers. On the other hand connectivity between the two wireless communication devices is still maintained as opposed to a legacy pre-emption case, which would cause complete pre-emption and loss of connectivity. In other words, this new type of pre-emption takes advantage of the resource reuse possibility between the cellular and D2D layers.

Likewise, a low priority D2D bearer can be pre-empted from the D2D layer to the cellular layer, meaning that the D2D bearer is effectively replaced by (two) cellular bearers between the respective UEs and the serving radio network node (e.g., eNB). Also in this case, this pre-emption may lead to QoS degradation since the D2D bearer may have higher signal to noise ratio (SNR), resulting in higher link budget, and lower delay. However, this kind of pre-emption may be possible if a D2D user can be provided service by the core network and thereby D2D resources can be freed.

Figure 9:
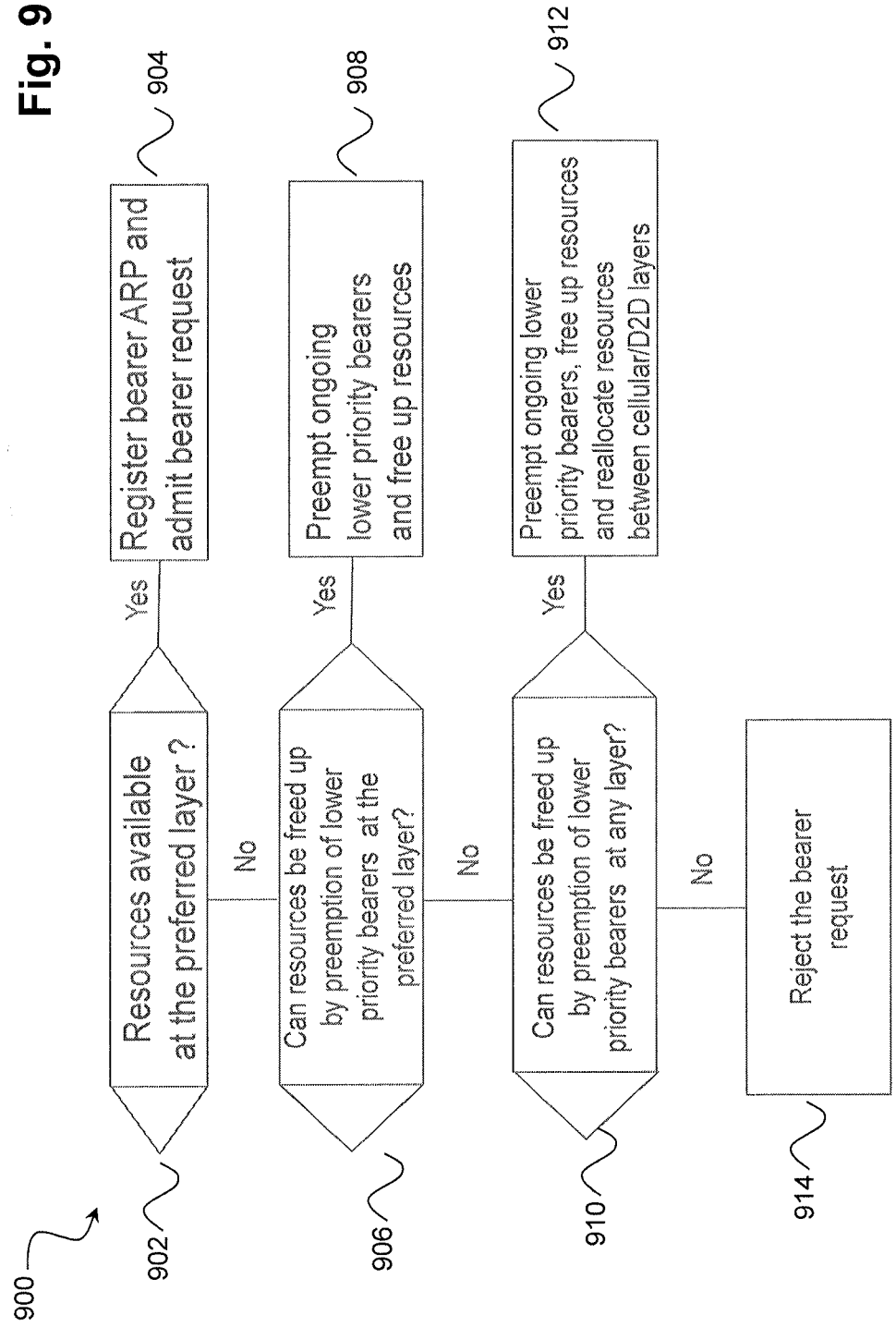
FIG. 9 illustrates a method for assigning resources to a wireless communication device requesting service.

FIG. 9 illustrates a method 900 for assigning resources to a wireless communication device requesting service, such as wireless communication device 110A. In an embodiment, method 900 may be implemented by network node 120 of FIG. 1 using the signaling mechanism illustrated in FIG. 2 or FIG. 3. Method 900 may apply to a device requesting either cellular or D2D resources and may be considered a generalized extension of method 700. For example, in certain embodiments, the preferred layer of the requesting device determined at step 902 may be communicated in the service request message of step 704 of method 700. At step 902, method 900 determines if resources are available at the preferred layer (the cellular or D2D layer) for the requesting device. If resources are available, for example, if an MSR threshold for the requesting device's preferred layer has not been exceeded, method 900 will assign resources at the preferred layer to the requesting device at step 904. The requesting device's priority level (ARP level) may also be registered by method 900 at step 904 for use in assignment of resources and preemption after the requesting device has been admitted.

If resources are not available at the requesting device's preferred layer, method 900 determines, at step 906, whether lower priority devices may be preempted at the preferred layer to free up resources for the requesting device. If lower priority devices using the preferred layer may be preempted, the lower priority devices are preempted and the requesting device is assigned the freed up resources at step 908. In certain embodiments, the preempted devices may be assigned resources on a layer other than their preferred layer if the non-preferred layer has available resources or if lower priority devices have currently been assigned resources on the non-preferred layer.

If there are no lower priority devices using the preferred layer that may be preempted to free up resources at the preferred layer, method 900 determines, at step 910, if there are lower priority devices using any layer that may be preempted to free up resources. If lower priority devices using a different layer than the requesting device's preferred layer may be preempted, method 900 will preempt a lower priority device from the non-preferred layer and assign the freed up resources on the non-preferred layer to the requesting device at step 912. For example, if a request has a priority of "High D2D" and there are no devices with a lower priority than "High D2D" using the D2D layer, method 900 may check to see if there are any devices with a priority of "Best Effort" using the cellular layer. If there are, method 900 may preempt one of the "Best Effort" devices from the cellular layer to free up resources on the cellular layer for the requesting device.

If there are no resources that can be freed up by preempting a lower priority device at the non-preferred layer (i.e., there are no lower priority devices at either layer currently using the network), then method 900 will reject the requesting device's request at step 914.

Certain embodiments may support an extended mode selection. The extended ARP information and the signaling mechanisms described in FIGS. 1-3 can also be used by radio network node 120 to make mode selection decisions that take into account the ARP priority levels and thereby the user preferences as well as the current congestion situation at the cellular and the D2D layers. The load in the radio access network does not only depend on the number of simultaneously ongoing RBs and their respective QoS levels, but also on the ratio of RBs that can and cannot be pre-empted. For example, if there are RBs that accept pre-emption, a congestion situation is manageable by pre-emption. In the case of high load of high priority (no-pre-emption ARP) bearers, a congestion situation is likely to be managed at the expense of QoS degradation of ongoing sessions and admission rejection of new RB requests. Therefore, in some embodiments, in case of congestion, radio network node 120 triggers mode selection decisions from the congested (cellular or D2D) layer to the less congested layer in terms of high priority ARP bearers.

Figure 10:
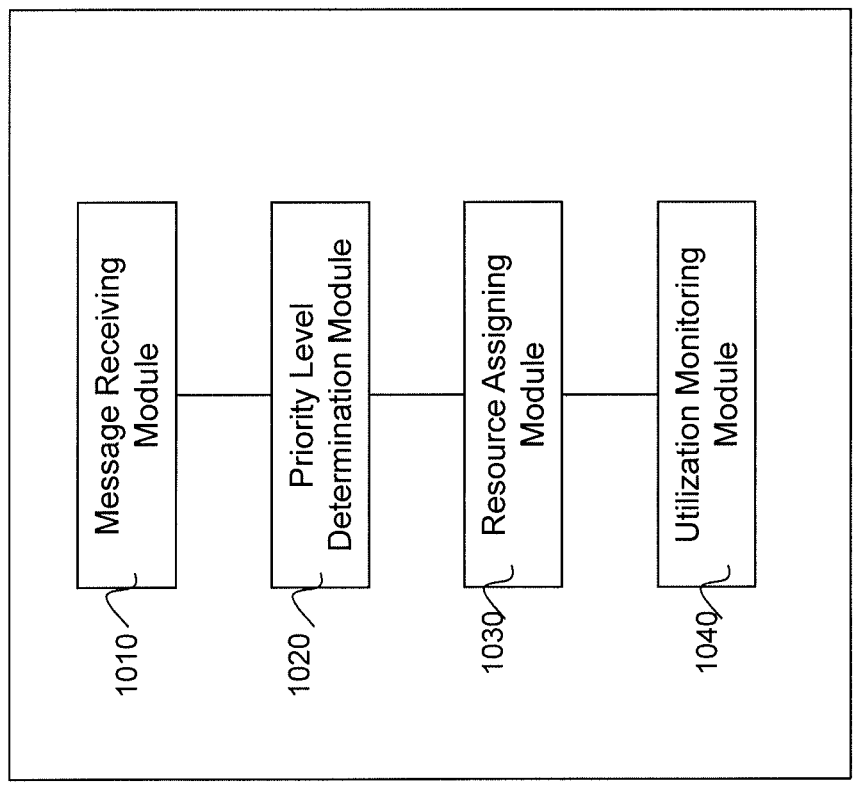
FIG. 10 illustrates an example of a network node operable to allocate resources based on priority.

FIG. 10 illustrates an example embodiment of network node operable to allocate resources based on priority. In the embodiment, network node comprises a message receiving module 1010, a priority level determination module 1020, a resource assigning module 1030, and a utilization monitoring module 1040. Message receiving module 1010 receives service request 200 from a wireless communication device 110A. Service request 200 requests connection of a communication session. The network node may process service request 200 or may pass service request 200 to another network node for processing (e.g., a radio network node 120 may pass non access stratum signaling to a core network node 130 for processing).

Priority level determination module 1020 determines a priority level for the requested communication session. The priority level may be determined based on explicit information in service request 200 if the service request includes a priority level indicator. In the alternative, the priority level may be determined implicitly based on the identity of wireless communication device 110A, the type of service requested by wireless communication device 110A (such as a voice service, a streaming data service, or a non-streaming data service), and so on. In some embodiments, the priority level information may be determined based on explicit information in a resource request 204 from another network node (e.g., a core network node 130 may process service request 200 and send the priority level to a radio network node 120 in resource request 204). Priority level determination module 1020 determines one or more of the priorities described with respect to FIG. 2 above (e.g., a cellular layer admission priority, a D2D layer admission priority, a cellular layer pre-emptible priority, and/or a D2D layer pre-emptible priority).

Resource assigning module 1030 determines whether to assign resources to wireless communication device 110A. Utilization monitoring module 1040 monitors a monitored system resource (MSR) utilization and informs resource assigning module 1030 if the MSR utilization exceeds a threshold. If the MSR utilization threshold exceeds a threshold, resource assigning module 1030 assigns resources based at least in part on the priority level determined by priority level determination module 1020. As an example, if the MSR utilization exceeds a D2D threshold, resource assigning module may preempt resources from the D2D layer and assign the resources to the cellular layer.

Figure 11:
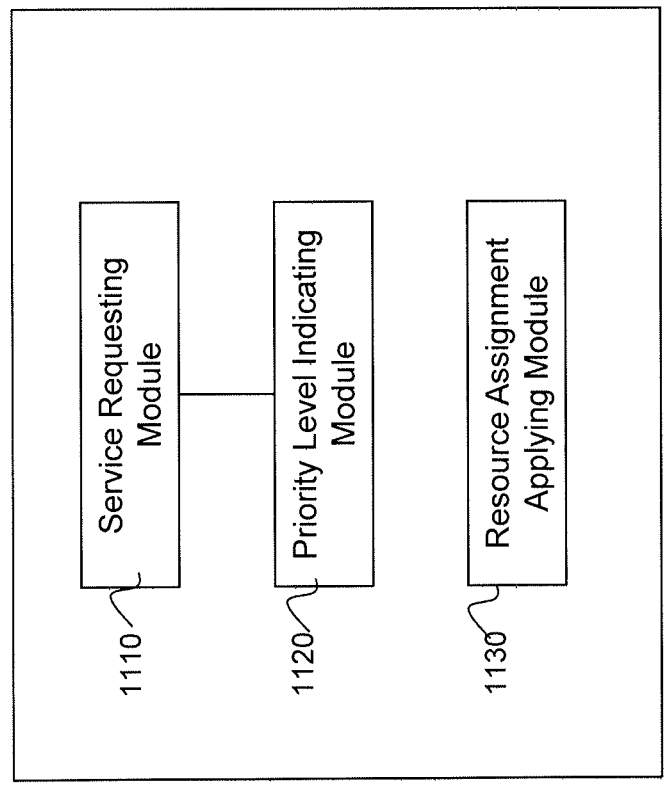
FIG. 11 illustrates an example of a wireless communication device operable to signal priority information to the network node of FIG. 10.

FIG. 11 illustrates an example of a wireless communication device 110 operable to signal priority information to the network node of FIG. 10. Wireless communication device 110 includes service requesting module 1110, a priority level indicating module 1120, and a resource assignment applying module 1130. Service requesting module 1110 sends a network node service request 200 for connection of a communication session. Priority level indicating module 1120 determines a plurality of priority level indicators to include in service request 200. The indicators include a cellular layer admission priority, a D2D layer admission priority, a cellular layer pre-emptible priority, and/or a D2D layer pre-emptible priority described with respect to FIG. 2 above. In response, resource assignment applying module 1130 receives resource assignment 212 from the network node and internally configures wireless communication device 110 to use the assigned D2D layer or cellular layer resources.

Some embodiments of the disclosure may provide one or more technical advantages. A technical advantage of particular embodiments includes allowing a network to determine whether to admit wireless communication devices to a D2D communication layer or a cellular communication layer depending on a preferred communication layer of the wireless communication device. Another technical advantage includes allowing a network to preempt wireless communication devices from one layer to another layer. Another technical advantage provides a D2D ARP-based RAC can operate in synergy with existing classical ARP-based cellular RAC without extensive standardization work. Another technical advantage includes the ability to define MSR utilization thresholds to balance the load on the cellular and D2D domain. Thus, in some embodiments, new D2D wireless communication device sessions are admitted only when there are sufficient radio and network resources such that sharing resources with D2D wireless communication devices does not degrade the performance of existing cellular wireless communication devices. Thus, the performance of the network can be maintained by choosing appropriate performance metrics for admitting the new wireless communication devices. In some embodiments the performance of the existing D2D wireless communication devices in the system can be protected when adding new D2D wireless communication devices. The D2D wireless communication devices can be admitted by taking into account variety of aspects (e.g., significance and criticality of their service, amount of resources needed, etc.) Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set. Modifications, additions, or omissions also may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the following claims.

The invention claimed is:

1. A network node for wireless communication between a wireless communication device and a network operable to assign resources for use in wireless communication, the network node comprising a processor and a memory, the network node-operable to:
   receive, from a wireless communication device, a service request message that requests connection of a communication session;
   determine a priority level for the requested communication session, the priority level comprising:
   a cellular layer admission priority of whether the network node can preempt cellular resources of an existing communication session to admit the requested communication session on the cellular layer;
   a device-to-device (D2D) layer admission priority of whether the network node can preempt D2D resources of an existing communication session to admit the requested communication session on the D2D layer;
   a cellular layer pre-emptible priority of whether the network node can preempt the requested communication session in order to admit a subsequent communication session on the cellular layer; and
   a D2D layer pre-emptible priority of whether the network node can preempt the requested communication session in order to admit a subsequent communication session on the D2D layer; and
   assign resources based at least in part on the priority level, wherein the resources are used for D2D communication or cellular communication.

2. The network node of claim 1, wherein:
   when the cellular layer pre-emptible priority of the requested communication session is lower than a cellular layer admission priority of a subsequent cellular communication session, the network node is operable to preempt the requested communication session from the cellular layer to the D2D layer to admit the subsequent cellular communication session on the cellular layer.

3. The network node of claim 1, wherein:
   when the cellular layer admission priority of the requested communication session is higher than a cellular layer pre-emptible priority of an existing cellular communication session, the network node is operable to preempt the existing cellular communication session or an existing D2D communication session to admit the requested communication session on the cellular layer; and when the D2D layer admission priority of the requested communication session is higher than a D2D layer pre-emptible priority of an existing D2D communication session, the network node is operable to preempt the existing D2D communication session, but the network node is not operable to preempt the existing cellular communication session, to admit the requested communication session on the D2D communication layer.

4. The network node of claim 1, wherein:
when the cellular layer admission priority of the requested communication session is lower than cellular layer pre-emptible priorities of existing cellular communication sessions and the D2D layer admission priority of the requested communication session is lower than D2D layer pre-emptible priorities of existing D2D communication sessions, the network node is operable to reject the requested communication session, not preempt the existing cellular communication sessions, and not preempt the existing D2D communication sessions.

5. The network node of claim 1, wherein to assign the resources based at least in part on the priority level, the network node is further operable to:
monitor a monitored system resource (MSR) utilization;
determine that the MSR utilization is below a D2D threshold;
assign D2D resources to the requested communication session;
after assigning the D2D resources to the requested communication session, determine that the MSR utilization exceeds the D2D threshold and is below a cellular threshold;
preempt resources from existing low priority D2D communication sessions and reallocate the resources to the cellular layer; and
move the requested communication session from the D2D layer to the cellular layer.

6. A method in a network node for assigning resources for use in wireless communication, the method comprising:
receiving, from a wireless communication device, a service request message that requests connection of a communication session;
determining a priority level for the requested communication session, the priority level comprising:
a cellular layer admission priority of whether the network node can preempt cellular resources of an existing communication session to admit the requested communication session on the cellular layer;
a device-to-device (D2D) layer admission priority of whether the network node can preempt D2D resources of an existing communication session to admit the requested communication session on the D2D layer;
a cellular layer pre-emptible priority of whether the requested communication session can be preempted in order to admit a subsequent communication session on the cellular layer; and
a D2D layer pre-emptible priority of whether the requested communication session can be preempted in order to admit a subsequent communication session on the D2D layer; and
assigning resources based at least in part on the priority level, wherein the resources are used for D2D communication or cellular communication.

7. The method of claim 6, further comprising:
when the cellular layer pre-emptible priority of the requested communication session is lower than a cellular layer admission priority of a subsequent cellular communication session, preempting the requested communication session from the cellular layer to the D2D layer in order to admit the subsequent cellular communication session on the cellular layer.

8. The method of claim 6, further comprising:
when the cellular layer admission priority of the requested communication session is higher than a cellular layer pre-emptible priority of an existing cellular communication session, preempting the existing cellular communication session or an existing D2D communication session to admit the requested communication session on the cellular layer; and
when the D2D layer admission priority of the requested communication session is higher than a D2D layer pre-emptible priority of an existing D2D communication session, preempting the existing D2D communication session, but not preempting the existing cellular communication session, to admit the requested communication session on the D2D communication layer.

9. The method of claim 6, further comprising:
when the cellular layer admission priority of the requested communication session is lower than cellular layer pre-emptible priorities of existing cellular communication sessions and the D2D layer admission priority of the requested communication session is lower than D2D layer pre-emptible priorities of existing D2D communication sessions, rejecting the requested communication session, not preempting the existing cellular communication sessions, and not preempting the existing D2D communication sessions.

10. The method of claim 6, wherein to assign the resources based at least in part on the priority level, the method further comprises:
monitoring a monitored system resource (MSR) utilization;
determining that the MSR utilization is below a D2D threshold;
assigning D2D resources to the requested communication session;
after assigning the D2D resources to the requested communication session, determining that the MSR utilization exceeds the D2D threshold and is below a cellular threshold;
preempting resources from existing low priority D2D communication sessions and reallocating the resources to the cellular layer; and
moving the requested communication session from the D2D layer to the cellular layer.

11. A wireless communication device comprising a memory and a processor, the wireless communication device operable to:
send a service request message to a network node, wherein the service request message requests connection of a communication session and includes a priority level indicator for the requested communication session, the priority level indicator comprising:
a cellular layer admission priority to be used by the network node for determining whether the network node can preempt cellular resources of an existing communication session to admit the requested communication session on the cellular layer;
a device-to-device (D2D) layer admission priority to be used by the network node for determining whether the network node can preempt D2D resources of an existing communication session to admit the requested communication session on the D2D layer;
a cellular layer pre-emptible priority to be used by the network node for determining whether the network node can preempt the requested communication session to admit a subsequent communication session on the cellular layer; and
a D2D layer pre-emptible priority to be used by the network node for determining whether the network node can preempt the requested communication session to admit a subsequent communication session on the D2D layer; and
receive a resource assignment from the network node.

12. The wireless communication device of claim 11, wherein:
when the cellular layer pre-emptible priority of the requested communication session is lower than a cellular layer admission priority of a subsequent cellular communication session, the network node is operable to preempt the requested communication session from the cellular layer to the D2D layer to admit the subsequent cellular communication session on the cellular layer.

13. The wireless communication device of claim 11, wherein:
when the cellular layer admission priority of the requested communication session is higher than a cellular layer pre-emptible priority of an existing cellular communication session, the network node is operable to preempt the existing cellular communication session or an existing D2D communication session to admit the requested communication session on the cellular layer; and
when the D2D layer admission priority of the requested communication session is higher than a D2D layer pre-emptible priority of an existing D2D communication session, the network node is operable to preempt the existing D2D communication session, but the network node is not operable to preempt the existing cellular communication session, to admit the requested communication session on the D2D communication layer.

14. The wireless communication device of claim 11, wherein:
when the cellular layer admission priority of the requested communication session is lower than cellular layer pre-emptible priorities of existing cellular communication sessions and the D2D layer admission priority of the requested communication session is lower than D2D layer pre-emptible priorities of existing D2D communication sessions, the network node is operable to reject the requested communication session, not preempt the existing cellular communication sessions, and not preempt the existing D2D communication sessions.

15. A method in a wireless communication device, the method comprising:
sending a service request message to a network node, wherein the service request message requests connection of a communication session and includes a priority level indicator for the requested communication session, the priority level indicator comprising:
a cellular layer admission priority to be used by the network node for determining whether the network node can preempt cellular resources of an existing communication session to admit the requested communication session on the cellular layer;
a device-to-device (D2D) layer admission priority to be used by the network node for determining whether the network node can preempt D2D resources of an existing communication session to admit the requested communication session on the D2D layer;
a cellular layer pre-emptible priority to be used by the network node for determining whether the network node can preempt the requested communication session to admit a subsequent communication session on the cellular layer; and
a D2D layer pre-emptible priority to be used by the network node for determining whether the network node can preempt the requested communication session to admit a subsequent communication session on the D2D layer; and
receiving a resource assignment from the network node.

16. The method of claim 15, wherein:
when the cellular layer pre-emptible priority of the requested communication session is lower than a cellular layer admission priority of a subsequent cellular communication session, the network node is operable to preempt the requested communication session from the cellular layer to the D2D layer to admit the subsequent cellular communication session on the cellular layer.

17. The method of claim 15, wherein:
when the cellular layer admission priority of the requested communication session is higher than a cellular layer pre-emptible priority of an existing cellular communication session, the network node is operable to preempt the existing cellular communication session or an existing D2D communication session to admit the requested communication session on the cellular layer; and
when the D2D layer admission priority of the requested communication session is higher than a D2D layer pre-emptible priority of an existing D2D communication session, the network node is operable to preempt the existing D2D communication session, but the network node is not operable to preempt the existing cellular communication session, to admit the requested communication session on the D2D communication layer.

18. The method of claim 15, wherein:
when the cellular layer admission priority of the requested communication session is lower than cellular layer pre-emptible priorities of existing cellular communication sessions and the D2D layer admission priority of the requested communication session is lower than D2D layer pre-emptible priorities of existing D2D communication sessions, the network node is operable to reject the requested communication session, not preempt the existing cellular communication sessions, and not preempt the existing D2D communication sessions.

* * * * *